United States Patent [19]
Rixen et al.

[11] Patent Number: 5,570,971
[45] Date of Patent: Nov. 5, 1996

[54] CONNECTION BETWEEN COMPONENTS

[76] Inventors: Wolfgang Rixen; Gerrit Pies, both of Friedenstrasse 107-109, D-42699 Solingen, Germany

[21] Appl. No.: 256,689

[22] PCT Filed: Jan. 20, 1993

[86] PCT No.: PCT/DE93/00043

§ 371 Date: Jul. 21, 1994

§ 102(e) Date: Jul. 21, 1994

[87] PCT Pub. No.: WO93/14280

PCT Pub. Date: Jul. 22, 1993

[30] Foreign Application Priority Data

Jan. 21, 1992 [DE] Germany .............................. 9200642 U

[51] Int. Cl.⁶ .................. A47G 5/00; F16C 11/00
[52] U.S. Cl. ................ 403/381; 52/71; 52/582.1; 52/589.1; 52/592.2; 52/592.4; 74/462; 160/135; 403/119; 403/364
[58] Field of Search .................. 52/71, 582.1, 589.1, 52/592.1, 592.2, 592.4; 74/98, 462; 160/135, 199, 206, 229.1; 403/52, 119, 121, 364, 381; 24/399, 402, 525, 577

[56] References Cited

U.S. PATENT DOCUMENTS

| 64,757 | 5/1867 | Garlinghouse ........................... 403/121 |
| 1,661,003 | 2/1928 | Miller ..................................... 160/229.1 |
| 2,142,305 | 1/1939 | Davis ...................................... 52/592.1 |
| 2,800,802 | 7/1957 | Rentschler ............................. 74/462 X |
| 3,092,870 | 6/1963 | Baer ..................................... 160/206 X |
| 3,848,298 | 11/1974 | Frohlich ................................ 24/399 X |
| 4,047,337 | 9/1977 | Bergstrom ............................... 52/71 |
| 4,112,782 | 9/1978 | Mullins ................................... 74/462 |
| 4,148,163 | 4/1979 | Chenin et al. .......................... 52/71 |
| 4,816,310 | 3/1989 | Truyens ................................ 428/12 |
| 4,941,763 | 7/1990 | Euteneuer ........................... 403/381 X |
| 4,999,879 | 3/1991 | Baer ...................................... 16/354 |

FOREIGN PATENT DOCUMENTS

| 0109466 | 5/1984 | European Pat. Off. . |
| 0292833 | 11/1988 | European Pat. Off. . |
| 0325528 | 7/1989 | European Pat. Off. . |
| 2649742 | 1/1991 | France .................................. 160/351 |
| 2541209 | 3/1977 | Germany . |
| 3118755 | 5/1982 | Germany . |
| 495310 | 4/1938 | United Kingdom . |
| 1381986 | 1/1975 | United Kingdom . |
| 1590607 | 6/1981 | United Kingdom . |
| 2277550 | 11/1994 | United Kingdom ................ 160/229.1 |
| WO86/07111 | 12/1986 | WIPO . |

*Primary Examiner*—Anthony Knight
*Assistant Examiner*—Andrea Chop
*Attorney, Agent, or Firm*—Herbert Dubno

[57] ABSTRACT

A connection assembly includes at least two components each formed with a body extending along a respective axis and a respective plurality of angularly equispaced alternating tongues projecting radially from the body and grooves for meshing with the tongues and grooves of the other component upon relative angular displacement of the components, so that the components are not able to be separated in a direction transverse to the axis upon the relative angular displacement.

10 Claims, 7 Drawing Sheets

CONNECTION BETWEEN COMPONENTS

CROSS REFERENCE TO RELATED APPLICATIONS

This application is a national phase of PCT/DE93/00043 filed 20 Jan. 1993 and based, in turn, upon German national application G92 00 642.6 filed 21 Jun. 1992, under the International Convention.

FIELD OF THE INVENTION

The invention relates to a connection between components, particularly for profiled rods, gears or the like, which roll off each other rotatively and thereby meshingly engage in the manner of gears at their circumference by means of alternately arranged, identically profiled tongues and grooves and which are coupled by transversal interlocking against unwanted radial disengagement, whereby the tongues and grooves are relatively displaceable about circumferentially parallel longitudinal axes.

BACKGROUND OF THE INVENTION

A connection with the above-mentioned features is known from EP-A-0 109 466. The known components are profiled rods with a substantially D-shaped cross section, which are toothed at their curvatures and are relatively displaceable about circumferentially parallel longitudinal axes and which are held together by clamping parts. Without these special clamping parts the profiled rods would not rest against each other during normal use, since their gear-like circumferential configuration does not insure against radial displacement away from each other.

A connection of components with interengaging undercuts is known from a frame of divider walls described in DE-OS 25 41 209. The components are profiled rods with an arrow-cross shaped cross section of the tongues and grooves, so that an arrow-cross shaped tongue can be introduced with its arrow-cross head into a groove having an arrow-cross shaped cross section. The relative position of two profiled rods connected this way can not be changed, if the play caused by tolerances is disregarded. The cross section of such a profiled rod is essentially square.

A generally known connection of profiled rods with square or rectangular cross sections is designed so that the neighboring profiled rods are interconnected by hinges. In order to fasten the hinges longitudinal grooves existing at the outer periphery of the rod and wherein screw fastening elements can be affixed are involved. By means of these hinges the profiled rods and thereby the wall or divider elements built with such profiled rods can be arranged at an angle to each other, which for instance is required when erecting exhibition stands or production spaces and separating them from each other. However the hinges involve a certain constructive effort and also considerable time is required for their mounting on the profiled rods. Furthermore the hinges are provided with a tilting angle of only 90° in order to allow for higher loads. As a result a change in the arrangement of wall elements can not be easily made, when a tilt angle of over 90° is required. In this case the hinge must be rebuilt. Besides such walls are not optically impermeable.

OBJECT OF THE INVENTION

By contrast it is the object of the invention to develop a connection of the aforementioned kind in such a manner that its components can have a pivoting angle, or can perform rotation up to 360°.

SUMMARY OF THE INVENTION

This object is achieved due to the fact that unwanted radial disengagement of the components is prevented by the tongues and grooves, in that they interengage with their undercuts while rolling off each other.

It is important for the invention that the relative movements of the components be possible, without having to give up their transversal interlocking. During all movements of the components about the circumferentially parallel axes, the tongues and grooves remain engaged. This engagement is designed so that during the relative movements of the components the tongues and grooves mesh in the manner of gears. However the difference is that constant transverse interlocking is insured. This transversal interlocking is of great importance for the components and for the structures being built therewith, because they render superfluous the connection elements which would have to be used otherwise in order to achieve this interlocking transversely to the longitudinal axes. In the case where the components are profiled rods it would thus be necessary to use the above-described hinges and in the case where the components are gears it would be necessary to secure their axes of rotation by taking additional constructive steps, such as the use of housings. Although the special shaping of the components with undercuts represents an additional expense due to additional profiling material, it serves at the same time for providing more rigidity to the components, thereby performing a double function.

In order to facilitate the meshing engagement of the components via their tongues and grooves, the connection is designed so that the tongues have at least as peripheral segments peripheral surfaces capable to function as roll-off surfaces and the grooves have at least as peripheral segments roll-off surfaces assigned to the peripheral surfaces. This insures that the tongues and the grooves can roll off each other where it is necessary for kinematic reasons, in order to reduce wear. The peripheral surfaces capable to serve as roll-off surfaces of the tongues and the roll-off surfaces of the grooves are correspondingly coordinated. It is self-understood that this attuned configuration is different depending on the shape of the components, so for instance it would correspond to the diameter of a gear or a gear-like component.

The connection can be designed so that the peripheral surfaces capable of serving as roll-off surfaces are formed by mushroom-like tongues with ellipsoidal top surface and/or that the roll-off surfaces of the grooves are ellipsoidal. The peripheral configuration of a component is such that its tongues have a cross section shaped like a mushroom head, which is elliptically or ellipsoidally shaped. Between two such tongues of a component shaped for instance like a profiled rod a groove with a special groove profile is located. This groove profile is a roll-off profile for the top surface of the mushroom head. Based on this shape during the relative swivelling or rotation between the components a defined roll-off motion between these components takes place, so that they are swivelled, respectively displaced or rotated relative to each other with mutually parallel longitudinal axes. The mushroom-head shape of the tongue cross section and the ellipsoidal shape of the grooves insure that the components cannot be transveresely separated, as long as the groove profiles are coordinated with the respective profiles of the mushroom head. In this case undercuts are formed which allow a tongue and a groove to get out of engagement only when grooves adjacent to the tongue of the one component has entered in a transversal interlocking engagement with the tongue adjacent to the groove of the other component. This way an undetachable transversal connection between the components is created, capable of bearing the loads corresponding to the profiling of the components. These consist for instance of metal or an elastic material, which however does not allow a separation of the components transverse to the axes, or the circumference, as a result of its elasticity.

It is advantageous when the outer peripheral surfaces of two mushroom heads, located between the respective top surface periphery and the roll-off surface on the mushroom stem, rest fully against each other in alternate engagement positions. In this case the profiling is done in such a way that in the alternate engagement case a comparatively slighter surface pressure occurs. This configuration makes also possible to provide the largest possible bearing cross sections in the area between the top surface of a tongue and the roll-off surface of a neighboring groove.

When the outer peripheral surfaces of two mushroom heads located between the respective top-surface edge and the edge of the roll-off surface at the mushroom stem are continuously curved, in the case of alternate engagement of a tongue and a groove no reduction of the surface pressure results, nevertheless any instability in the course of a roll-off motion of the rollingly meshing components is avoided. This, for instance, is the case where the components are gears and makes possible higher rotational speeds and/or a uniform force transmission, and as a result the dynamic load of the components is also decreased.

Suitably the connection is designed so that the distance between the top-surface edges of a tongue is approximately three times as big as the stem thickness between the roll-off surfaces of neighboring grooves. A sufficiently wide surface results, but on the other hand, also a sufficiently thick tongue in the stem area, which is the thinnest portion of the tongue.

In order to use the components for a variety of purposes, the connection is designed so that components shaped as profiled rods have fastening grooves which are separate from the connection grooves. The fastening grooves can be designed to suit the respective fastening requirements, whereby all known profiles can be used, as long as they do not impede the relative swivel displacements of the rod.

Normally it is sufficient, e.g. when using profiled rods for building wall elements, that they be positioned very close next to each other with their large surfaces, for instance in order to form a stack of reduced volume. For such a case it is sufficient when the connection is designed so that the tongues and the grooves are distributed over 180° of the circumference of a component designed as a profiled rod.

The assembly of two profiled rods, or of wall elements built with such profiled rods can be done by using various techniques, for instance by using the elasticity of the rod material, or by using the expansion behavior of the rod material during temperature changes. However the least expensive way of assembly, from the apparatus point of view, is achieved in that at least two components shaped like profiled rods can be longitudinally linked through tongues and grooves.

The connection can be designed so that the components have at least on one part of their circumference an equally big circumference diameter as well as an equal number of tongues and grooves. As a result at least pairwise the components have the same configuration, a fact which makes possible a corresponding rationalization of the finishing process. The loads on the components are also correspondingly equal.

It has proven to be advantageous when at least one component is designed like a gear with a minimum of 8 teeth. Such a component can be of multiple use in transmission and drive systems, where it can cooperate with identically shaped components or with components having differently shaped cross sections, but coordinated to engage therewith.

The connection can also be designed so that the one component has a bigger circumference diameter than the other component or it is planar and that two tongues of the other component engage in a single, enlarged groove of the other component. As a result of such designs of the components the possibilities of use increase. By widening the connection groove of a component it is possible to increase decisively the diameter of its circumference, up to an infinite circumference diameter. The widening of a groove causes thereby the meshing engagement of the other component in the single, widened groove to be maintained, which means that the desired relative roll-off motion being insured this way. If the one component has a comparatively large circumference or is even planar, then even several other components can cooperate with the one in particularly liberal configurations.

When the widening of a groove is so big that an unstable course of motion between the components has to be feared, the connection can be designed so that the one component has a guide tongue engaging between two connection tongues of the other component. The guide tongue takes over the position stabilization at the connection tongues of the other component, so that a secure engagement, respectively transversal interlocking of the components remains insured, especially during engagement alternations.

It is advantageous when the components are shaped like profiled rods for protection and divider walls. In the case of this walls the connection is formed by a link over the entire rod length. Several wall elements can be coupled like a pontoon bridge and their connection allows a completely extended arrangement on the one hand, as well as their folding for stacking purposes, on the other hand.

Advantageously the connection is designed so that the components are on the one side like grab buckets and like fixed holders on the other side and/or are built like connectable work desks. As a result of this configuration, the grab container can be swung in spite of its interlocking connection with the fixed holder and is therefore easier accessible at work sites. Correspondingly the work desks can be arranged at any desired angle, without creating open gaps, or undesired distances between the work desks.

It is advantageous that the components be designed as parts of articulations and hinges of machine assemblies and/or as parts of grippers or arms of material-handling installations and/or as parts of motion transmissions. The articulations and hinges of machine assemblies can have large opening angles. It is not require to fix their axis of rotation. The construction is optically impermeable. When the components are parts of grippers and arms of material-handling installations, they can be components of several articulations, e.g. in order to be movable in openings, or at undercuts. When they are used in motion transmissions they are special gears which can work with angle-dependent correlation of rotation and produced translation.

It is also advantageous when the other component is a gear and the one component is a driving and/or driven strand. In such a connection special application fields result in the conveyor technology. The driving and/or driven strand can be a toothed belt. The possibility to drive transport rollers by means of such a toothed belt arises. In such constructions it is to be noted as a special advantage of the components that a wrapping around the gear is not necessary. Therefore many problems which result from the wrapping are not present. The belt, or the strand is guided by the gear possibly also with a convex positioning with respect to the gear, so that it is increasingly secured against slippage of the belt. The same applies also to chains if they are profiled as described.

In the field of material handling it is advantageous when the one component is a wall or a ceiling plate on which the other component designed as a gear can be displaced in all directions of the plate. Particularly flexible supply systems can be built. The rotations of the component designed as a gear in combination with its axially parallel displacements make possible for instance at the ceiling plate to reach any desired location in the space underneath this ceiling plate, for instance in order to mount a machine tool at any desired location underneath the ceiling plate, in order to put it to use for machining, according to necessity.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
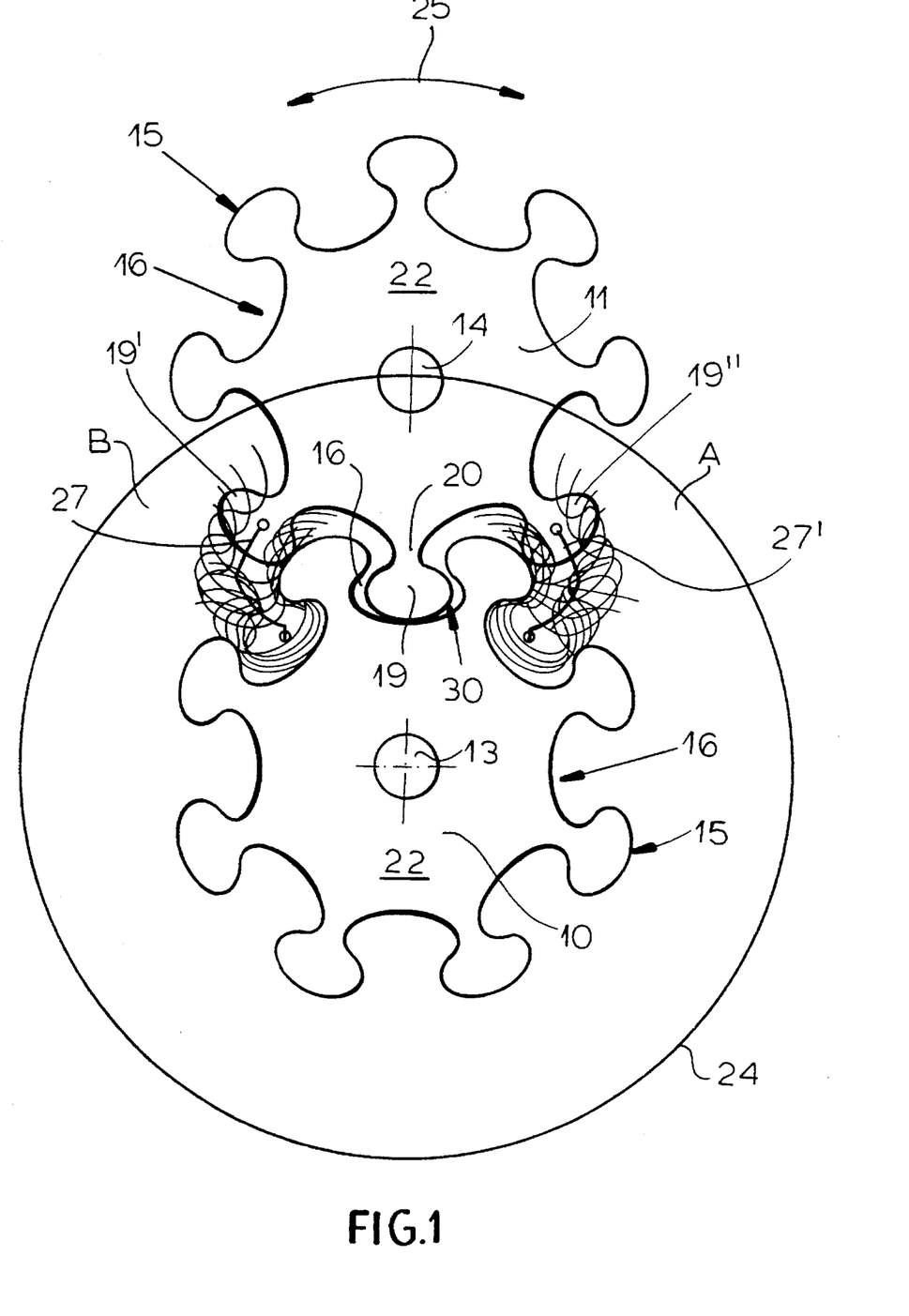
FIG. 1 is an end view showing two interengaged components, which can roll off each other with their outer peripheries.
Figure 3:
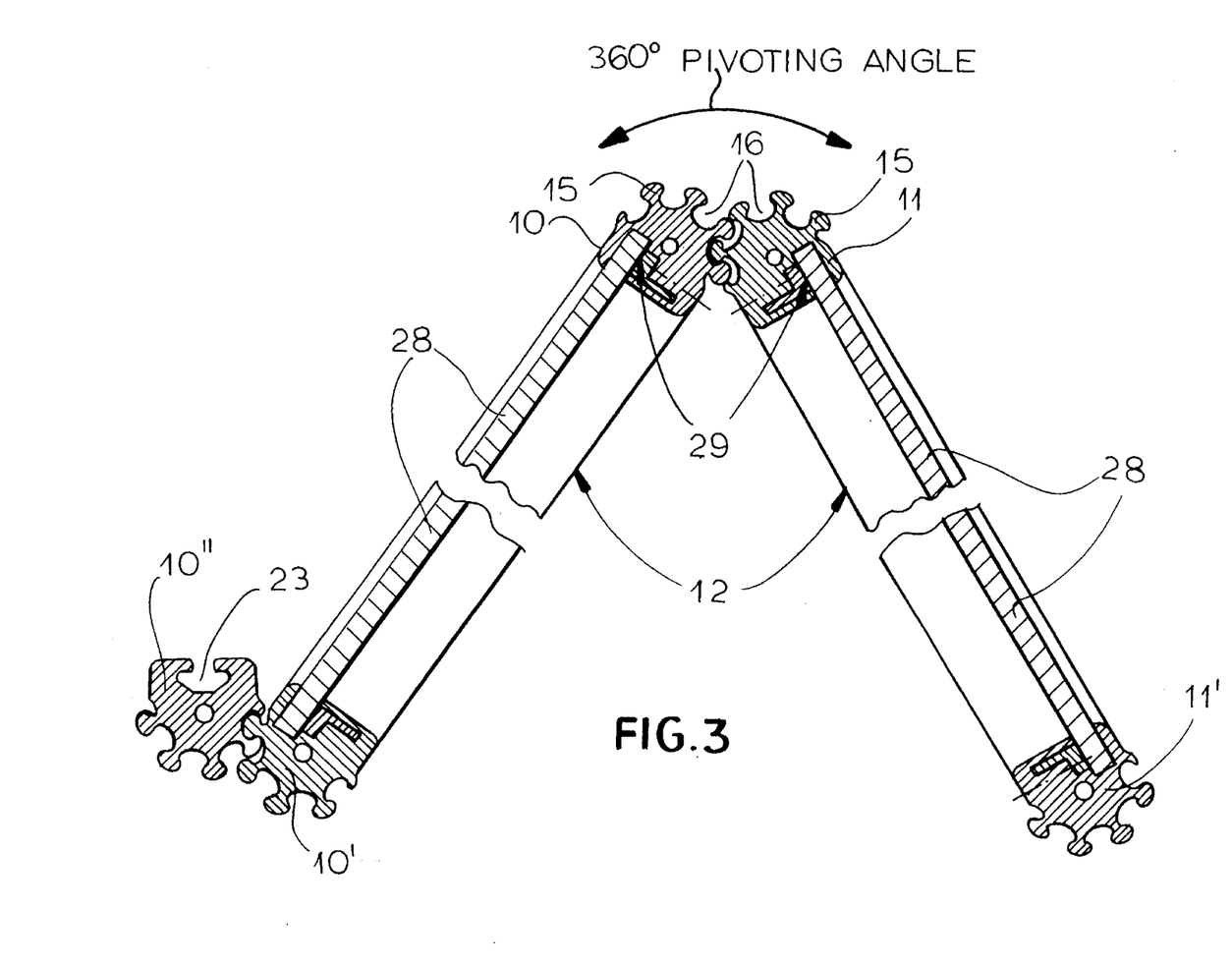
FIG. 3 is a partial sectional view of wall elements with profiled rods, shaped according to the invention.
Figure 4:
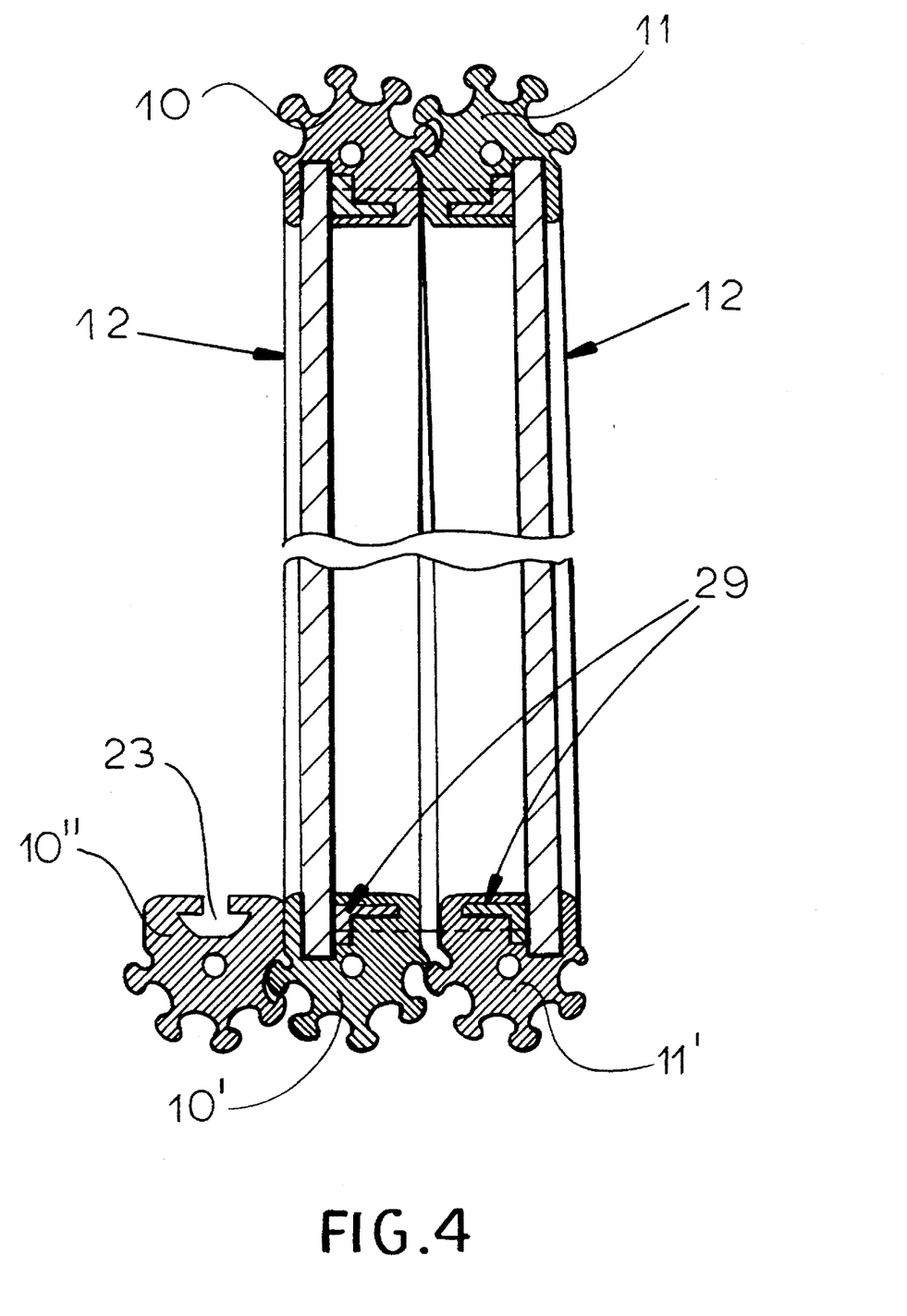
FIG. 4 is a view similar to FIG. 3 with the parts thereof in another position.

In FIG. 1 two components 10, 11 are shown, which are provided at their outer circular circumference with an alternation of longitudinally running tongues 15 and grooves 16. The evident toothed profile results, wherein the tongues 15 and the grooves 16 represent transverse connection parts, which when engaged do not allow an undesired radial motion away from each other of the components 10, 11. For this purpose the cross section of each tongue 15 is shaped like a mushroom head 19. A mushroom head 19 is fastened via each mushroom stem 20 to the central body 22 of a component 10, 11. The upper component 10 can roll about the lower component 11 on an only approximately circular path, which according to FIGS. 3 and 4 is used for instance to perform position changes of e.g. wall elements 12.

From FIG. 1 can be seen that the mushroom heads 19', 19" neighboring a mushroom head 19, assume the numerous indicated respective intermediate positions, when the longitudinal axis 14 of the component 11 moves between points A, B of path 24 in the direction of double arrow 25. In all these positions the middle mushroom head 19 is interlocked with the receiving groove 16 of component 10. The intermediate positions of this head 19 are not shown for the sake of clarity.

Figure 2:
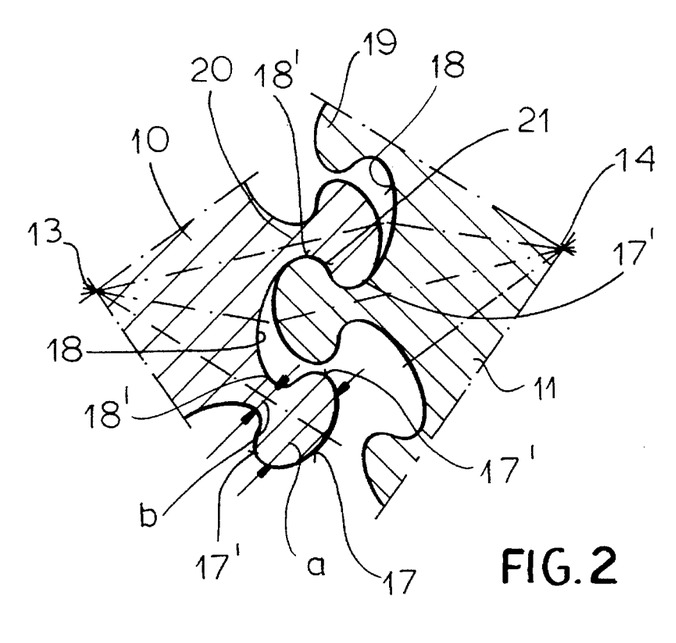
FIG. 2 is an enlarged sectional representation of two sectors of engaged components.

Each mushroom head 19, 19' 19" has a top surface 17 as a peripheral surface 30 capable of being a roll-off surface, which is outwardly oriented located according to FIG. 2 at a distance a from the opposite top surface edges 17'. This distance a is the biggest width extent of the mushroom head 19 or of tongue 15. The top surface 17 located between the top surfaces 17' is elliptic or ellipsoidal. As ellipsoidal can be considered each shape which affords a comparable roll-off effect to the one of elliptic surfaces, for instance also a surface composed of several small flat surface segments. The mushroom stem 20 bearing the mushroom head 19 has a most narrow web point with the width b. Each two grooves 16 adjacent to the mushroom head 19 have an elliptic or ellipsoidal roll-off profile 18 between two roll-off surface edges 18', which lie exactly at the narrowest point of the mushroom stem 20. The minimal stem thickness b is important for the radial connection stability of the components 10, 11 and therefore should not be too small. A suitable dimension is obtained when the distance a between the top surface edges 17' is approximately three times as big as the minimal stem thickness b. For the formation of the roll-off profile it is not absolutely required to provide an elliptic shape. Especially it is also conceivable to come close to an elliptic shape by connecting to each other many small and flat surface segments.

Between the roll-off surface edge 18' of a groove 16 and the neighboring top surface edge 17' there is an outer peripheral surface 21, which at each mushroom head 19 is shaped so that the outer peripheral surfaces 21 of two mushroom heads 19 engaging in the groove 16 of the components 10, 11 can rest against each other with their full surface. This is however not absolutely necessary for the engagement function, but makes lower surface pressures possible. The full surface contact between two outer peripheral surfaces 21 is present during alternations of the engagement position. For instance during alternation of the engagement position the roll-off support of mushroom head 19 of component 11 on the roll-off profile of component 10 changes to a roll-off support of a mushroom head 19 of the component 10 on the roll-off profile 18 of the component 11. FIG. 2 shows precisely this alternation of engagement position.

Figure 1A:
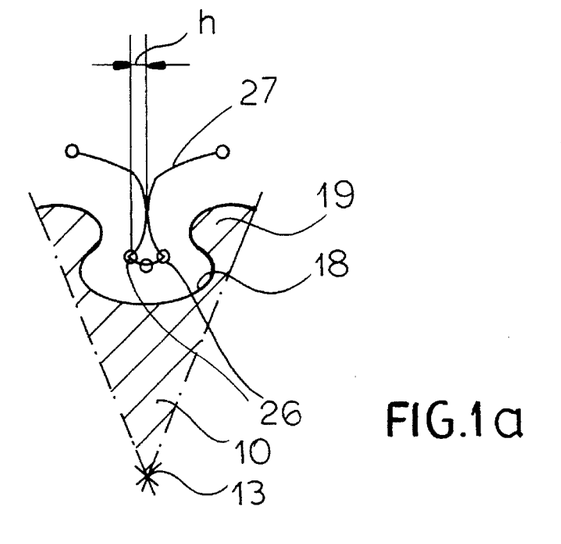
FIG. 1a is a partial sectional view of a component of FIG. 1 explaining the course of the swivelling displacement motion.

During alternation of the engagement position a mushroom head 19 has the maximal deviation from the groove middle. This can be seen especially from FIG. 1a, wherein a curve 27 is represented which is described by the tooth middle of a mushroom head 19 while it is rolling off in a groove 16. The curve 27 results from the position of all tooth middles when as shown in FIG. 1 a mushroom head moves into a groove 16 and then after rolling off the roll-off profile 18 moves out again of the groove 16. Correspondingly the two branches 27' of the curve 27 are shown according to FIG. 1a. The curve points 26 of the curve 27 mark the position of the tooth middle during the alternation of engagement position. These are the points of maximal deviation of the tooth middle from the groove middle. Their distance h characterizes the size of the undercut, i.e. of the maximal distance seen in FIG. 1 of a top surface edge 17' from a neighboring edge of a roll-off profile 18', and thereby characterizes the extent of the roll-off profile 18 with respect to the top surface 17 in the peripheral direction of the component.

FIG. 3 shows in cross section a modified construction of the components 10, 11, as parts of wall elements 12. Each wall element 12 consists of two vertical components 10, 10', respectively 11, 11', perpendicular to the plane of the figure, which are connected to a frame by parallel horizontal bars which are outside the figure. The frame surrounds the outer edges of a plate 28, a grid or a light-permeable pane, which is held by the holding elements 29 of the components 10, 10', respectively 11, 11'. For this purpose tongues 15 and grooves 16 are distributed only over a part of the entire circumference of the components 10, 11, namely over an area of 180° of the outer periphery facing away from plate 28. In the area of the outer periphery facing plate 28 there is a fastening groove 23 which is occupied by the edge of plate 28 and a fastening element. FIG. 3 shows also a component 10", having a further fastening groove 23 shaped like a mushroom head in order to be able to accommodate for instance corresponding support parts, which serve for anchoring the component 10" for instance to a stationary frame.

From a comparison of FIG. 3 with the FIG. 4 showing the same components results that the maximum pivoting angle equals 360°. It is namely possible to tilt away the wall element 12 formed by components 11, 11' from the one large lateral surface of the wall element 12 formed by the components 10, 10' outwardly so far over the position shown in FIG. 3, that the wall element 12 formed by the components 11, 11' comes to lie against the other side of the wall element formed by components 10, 10', if before that the component 10" was correspondingly swung. Corresponding to that the connection is suited to do well without transversal connecting parts in the case of a pivoting angle of 360°.

In each of the figures it was shown only that two components 10, 11 are in fixed radial interlocking. However with an appropriate profile shape it is conceivable that for instance three components are engaged, if what actually matters is their connection and smaller pivoting angles can be acceptable. Thus the connection is so designed that at least one of the components is a gear with a pitch circle radius. Preferably the gear has eight teeth and a pitch radius of 20 mm.

Large pivoting angles, respectively rotational motions of components become possible when these are designed according to FIG. 1 or 5 to 8. From FIG. 1 it can be seen that the components 11 can move on the represented path 24 about the stationary component 10. If the longitudinal axes 13, 14 of both components 10, 11 are driven the same distance and in the same direction, a horizontal displacement results instead in conditions of meshing engagement of the two components 10, 11. At any time the transversal interlocking coupling is insured over the tongues 15 and grooves 16.

Figure 5:
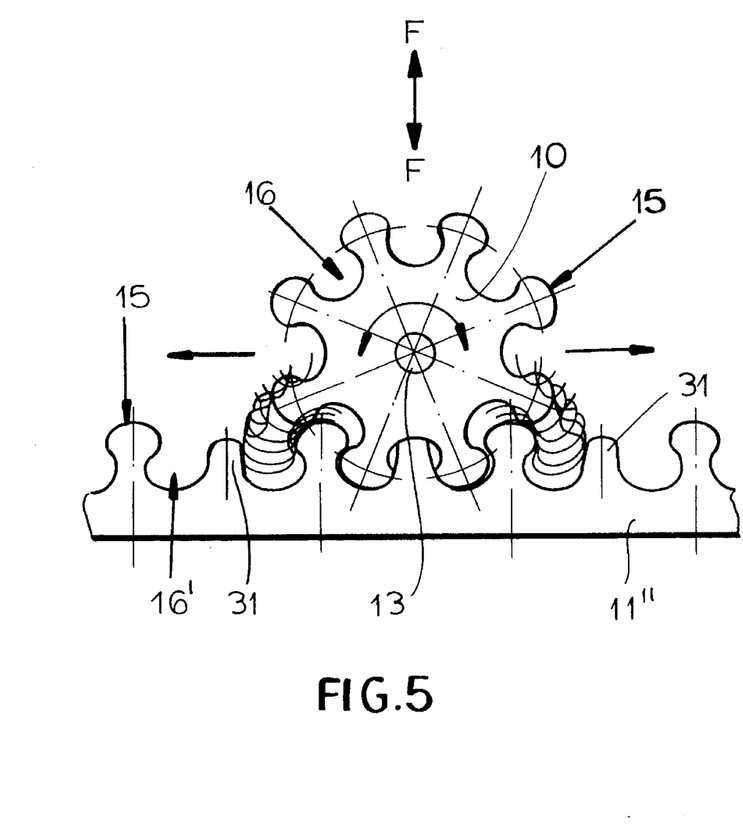
FIGS. 5 and 6 are views similar to FIG. 1 showing interconnection of components, of which one is planar.
Figure 6:
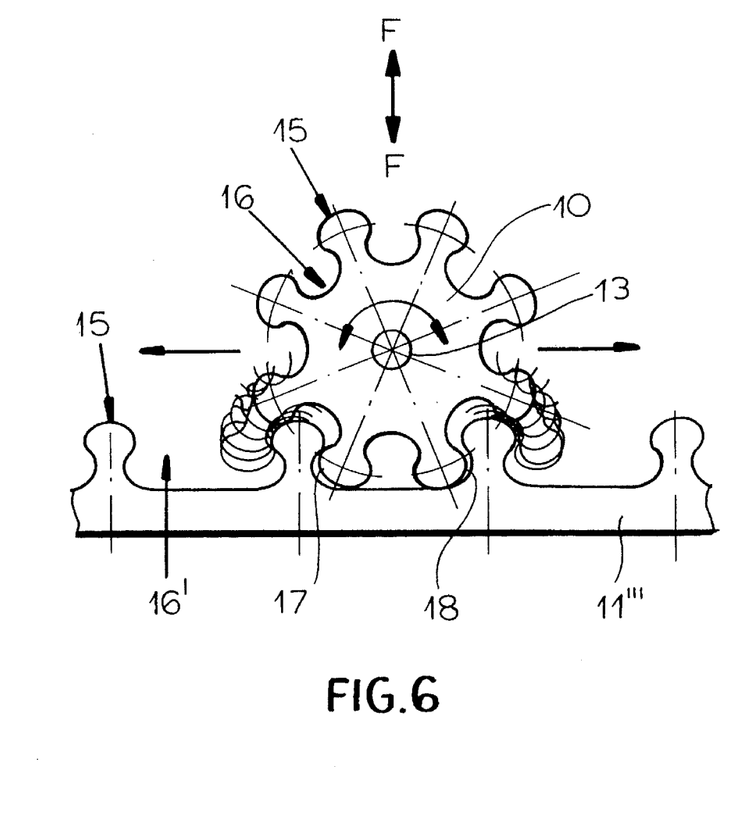
Figure 7:
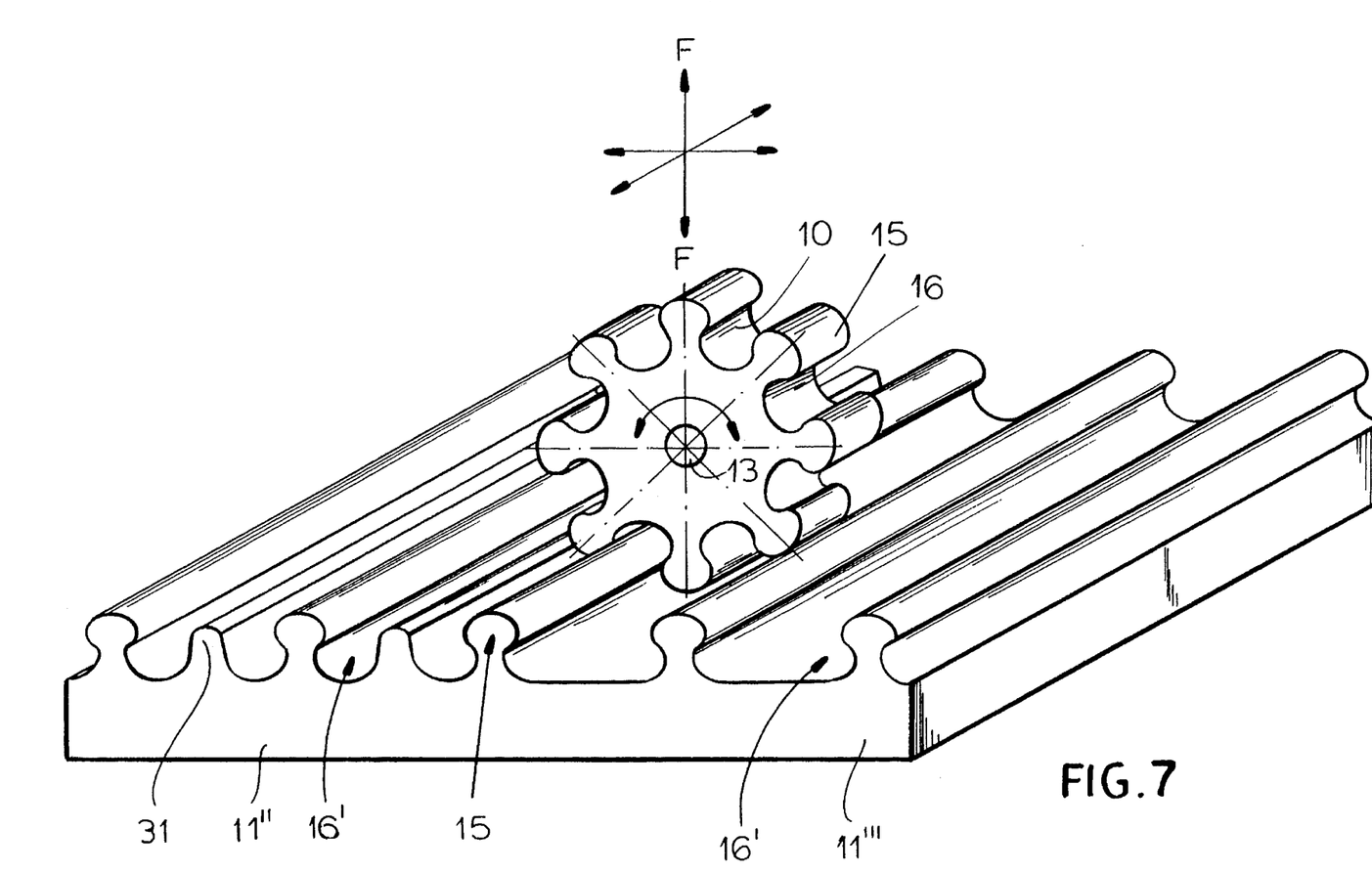
FIG. 7 is a perspective view of components, one of which is of a combined design corresponding to the planar components of FIG. 5, 6.
Figure 8:
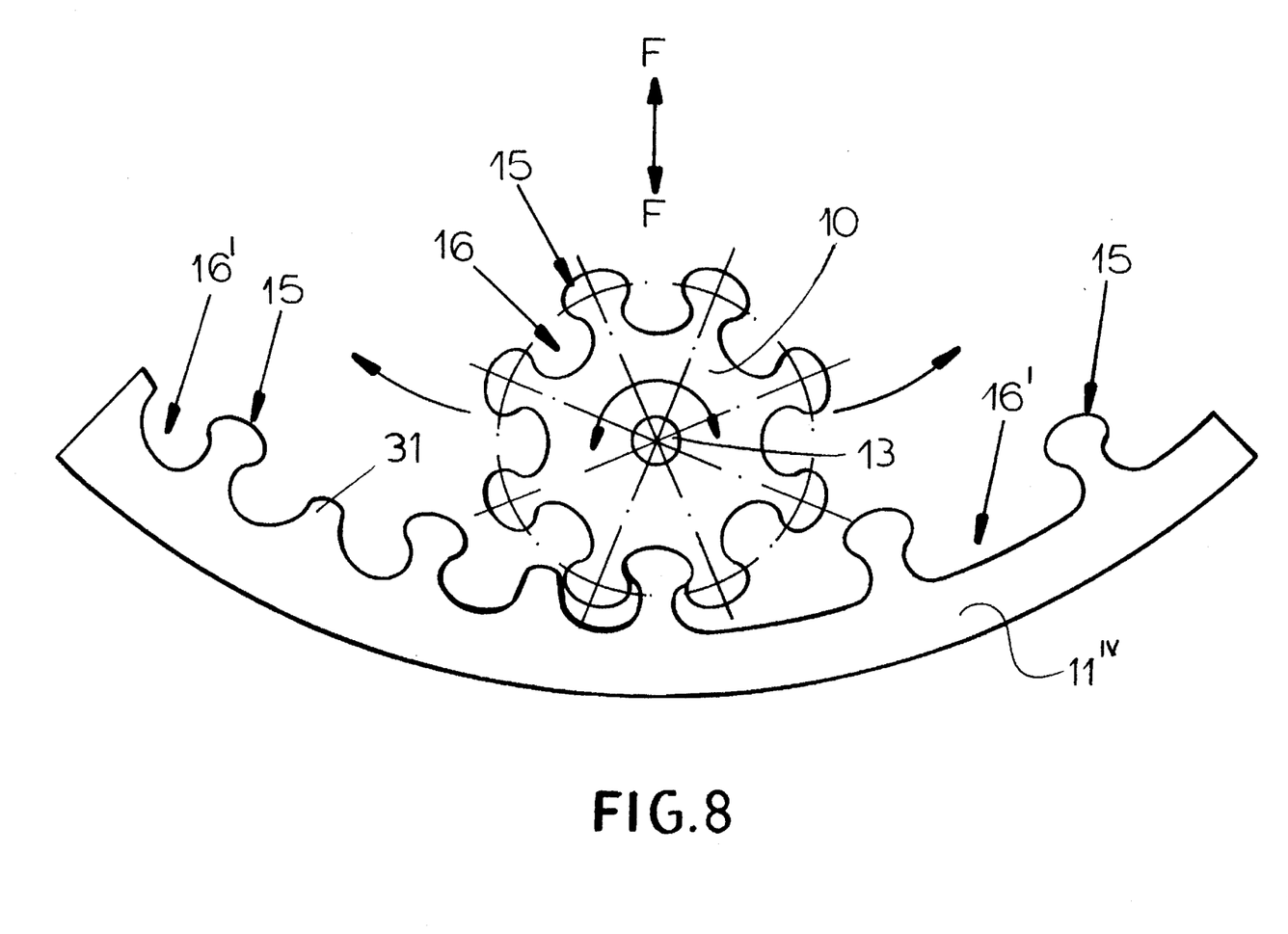
FIG. 8 is an end view of a configuration of components similar to FIG. 7, one of which is curved with a large diameter.

According to FIG. 5, 6 and 7 the components 11", 11''' are elongated, namely flat, thus with an axis 14 at infinite. On the components 11", 11''' there are tongues 15 facing the other component, which however have a widened groove 16' between them. The widening is required so that the other component 10 can engage with two tongues 15 in each groove 16, whereby then correspondingly smaller segments of the top surfaces 17 of each mushroom head 19 of the mushroom-head-like connection tongues 15 roll on assigned roll-off surfaces 18 which are essentially located in the area of the undercut created by the mushroom-head shape. Inasmuch the embodiments of FIG. 5 and 8 are no different. However it is essential with regarding to the guidance of the other components 10 in the area of the grooves 16' that in FIG. 5 and in the left segments of FIG. 7, 8 these components have guide 31, by means of which the other component 10 is stabilized especially during engagement alternation, especially in order to prevent a disengagement of the components 10, 11", respectively 11''' respectively 11$^{IV}$.

From FIG. 8 it can be seen that the components 10', 11' can also have different finite circumference diameters, whereby the circumference diameter of the component 11$^{IV}$ is substantially larger than the circumference diameter of component 10. Even so the groove 16' can be shaped so that the other component 10 rolls off as intended, by maintaining the transversal interlocking coupling of both components 10, 11$^{IV}$. In FIG. 5, 6 and 8 it is indicated that the components 10, 11", 11''', 11$^{IV}$ can move in the direction given by the straight arrows, without getting detached from one another. It is this way possible that the entire system can move in the direction F—F, without the disengagement of its components 10, 11", 11''', 11$^{IV}$.

Furthermore FIG. 7 shows that the component 10 can be displaced not only in two opposite direction in relation to the other component 11", 11''', 11$^{IV}$, but also in all directions of a plane, when the component 11", respectively 11''' is shaped like a plate.

We claim:

1. A connection assembly comprising:

a first elongated rigid profiled component extending along a longitudinal axis and formed with a multiplicity of angularly equispaced notches and a multiplicity of angularly equispaced tongues projecting radially from said first elongated rigid profiled component, said tongues and notches alternating with one another, each of said tongues having an arcuate convex ellipsoidal outer peripheral surface, a pair of undercut surfaces extending inwardly from ends of said arcuate convex outer peripheral surface, and a stem; and at least one second elongated rigid profiled component formed with a respective multiplicity of angularly equispaced notches and a respective multiplicity of angularly equispaced tongues projecting radially from said second elongated rigid profiled component and alternating with the respective notches, each of said tongues of the second elongated rigid profiled component being of a mushroom-shaped cross section having an arcuate convex ellipsoidal outer peripheral surface and having a pair of undercut surfaces extending inwardly from ends of said arcuate convex outer peripheral surface, and a stem, said first and second elongated rigid profiled components being in an engaged position upon mutual axial displacement of said elongated rigid profiled components, so that one of said tongues of the second elongated rigid profiled component slides along a respective one of said multiplicity of notches of the first elongated rigid profiled component, each of said notches of said first and second elongated rigid profiled components being larger than each of said notches, so that said first and second elongated rigid profiled components are mutually angularly pivotal with respect to each other in said engaged position, the undercut surfaces of one respective tongue of the first elongated rigid profiled component engaging the undercut surfaces of a respective pair of tongues of the second elongated rigid profiled component flanking said one respective tongue and thereby preventing separation of said elongated rigid profiled components in a direction transversely to the longitudinal axis in the engaged position during pivoting.

2. The connection assembly defined in claim 1 wherein each of said outer peripheral surfaces of each tongue is approximately three times bigger than a thickness of the respective stem defined between a respective pair of undercut surfaces.

3. The connection assembly defined in claim 1 wherein said first elongated rigid profiled component is formed with a circumference provided with said multiplicity of tongues and notches distributed over 180° of said circumference.

4. The connection assembly defined in claim 1 wherein said multiplicity of tongues and notches of the first elongated rigid profiled component is equal to the multiplicity of tongues and notches of the second elongated rigid profiled component.

5. The connection assembly defined in claim 1 wherein at least one of said first and second elongated rigid profiled components includes a gear segment having a pitch circle radius of 20 mm and eight teeth on a corresponding complete circular circumference.

6. The connection assembly defined in claim 1 wherein said first and second elongated rigid profiled components include gear segments having different diameters.

7. The connection assembly defined in claim 1 wherein at least one of said first and second elongated rigid profiled components is a profiled rod formed with respective fastening grooves.

8. The connection defined in claim 1 wherein the first elongated rigid profiled component is flat and the second elongated rigid profiled component includes a gear segment.

9. The connection assembly defined in claim 1 further comprising at least one wall panel, said first elongated rigid profiled component being mounted on said wall panel.

10. The connection assembly defined in claim 9 further comprising another wall panel receiving the second elongated rigid profiled component, said one and other walls being divider walls.

* * * * *